(12) United States Patent
Ben-Shalom

(10) Patent No.: US 9,837,827 B2
(45) Date of Patent: Dec. 5, 2017

(54) SYSTEM OF INDUCTIVE POWER TRANSFER

(71) Applicant: POWERMAT TECHNOLOGIES LTD., Neve Ilan (IL)

(72) Inventor: Amir Ben-Shalom, Modiin (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 413 days.

(21) Appl. No.: 14/560,189

(22) Filed: Dec. 4, 2014

(65) Prior Publication Data

US 2015/0084430 A1  Mar. 26, 2015

Related U.S. Application Data

(63) Continuation of application No. PCT/IL2013/050486, filed on Jun. 5, 2013.
(Continued)

(51) Int. Cl.
*H02J 7/00* (2006.01)
*H02J 5/00* (2016.01)
(Continued)

(52) U.S. Cl.
CPC .............. *H02J 5/005* (2013.01); *H01F 38/14* (2013.01); *H02J 7/025* (2013.01); *H04B 5/0037* (2013.01); *H04B 5/0093* (2013.01)

(58) Field of Classification Search
USPC .......................................... 307/104; 320/108
See application file for complete search history.

(56) References Cited

U.S. PATENT DOCUMENTS 7,952,322 B2 * 5/2011 Partovi ................... H01F 5/003
  320/108
8,917,057 B2 * 12/2014 Hui ......................... H01F 38/14
  320/108

(Continued)

OTHER PUBLICATIONS

International Search Report for International Application No. PCT/IL2013/050486 dated Oct. 3, 2013.
(Continued)

*Primary Examiner* — An Luu
(74) *Attorney, Agent, or Firm* — William Dippert; Laurence Greenberg; Werner Stemer

(57) ABSTRACT

An inductive power transmitter comprises a first primary inductor configured to inductively couple a first secondary inductor and configured to hold a first variable electrical potential. The transmitter also comprises a second primary inductor configured to inductively couple a second secondary inductor that is configured to hold a second variable electrical potential. The primary inductors are arranged in an overlapping fashion on a substrate forming a charging surface. The first primary inductor is connected to a first driver capable of providing the first variable electrical potential, and the second primary inductor is connected to a second driver capable of providing the second variable electrical potential in a first embodiment while a second possibility is that the first primary inductor is connected to a first driver capable of providing the first variable electrical potential, and the second primary inductor comprises capacitor and is not connected to a driver.

16 Claims, 10 Drawing Sheets

Related U.S. Application Data

(60) Provisional application No. 61/655,773, filed on Jun. 5, 2012.

(51) Int. Cl.
  *H01F 38/14* (2006.01)
  *H04B 5/00* (2006.01)
  *H02J 7/02* (2016.01)

(56) References Cited

U.S. PATENT DOCUMENTS

| | | |
|---|---|---|
| 2009/0251102 A1 | 10/2009 | Hui |
| 2010/0219791 A1 | 9/2010 | Cheng et al. |
| 2010/0259217 A1 | 10/2010 | Baarman et al. |
| 2011/0221385 A1 | 9/2011 | Partovi et al. |

OTHER PUBLICATIONS

International Preliminary Report on Patentability for International Application No. PCT/IL2013/050486 dated Dec. 9, 2014.

\* cited by examiner

SYSTEM OF INDUCTIVE POWER TRANSFER

CROSS-REFERENCE TO RELATED APPLICATIONS

This application is a continuation of PCT/IL2013/050486 filed Jun. 5, 2013, now published as WO/2013/183054, which claims the benefit of U.S. Provisional Application Ser. No. 61/655,773, filed Jun. 5, 2012, the disclosures of which are hereby incorporated by reference in their entirety herein.

FIELD OF THE DISCLOSURE

The embodiments disclosed herein relate to inductive power transfer systems. In particular, the embodiments relate to inductive power transmitters comprising at least two overlapping snake-shaped primary inductors, wherein the area encompassed by the primary inductors comprises no area with zero net magnetic field.

BACKGROUND

Typically, in an inductive power transfer system, the primary inductor of the inductive power transmitter is in the shape of a coil. However a coil-shaped primary inductor is not optimal for creating a large charging surface. An inductive power transmitter with the primary inductor being a large-diameter coil has a flaw that the resulting magnetic field lacks uniformity and can vary in intensity over several orders of magnitude. The induced voltage generated in a small-diameter secondary inductor, when placed in the center region of the large-diameter primary inductor (weak magnetic field) compared to when placed near the edge of the same primary inductor, can potentially vary from 1 to 100 volts (depending of the specifications of the system). Further, the non-uniformity of the magnetic field becomes worse as the diameter of the primary inductor coil is increased. In addition, the extension of the magnetic field in the Z axis increases with the diameter of a coil-shaped primary inductor, which may or may not be desired.

Thus, an improved inductive power transfer system with an inductive power transmitter capable of transmitting power to an inductive power receiver with more uniformity across a wide area is desired.

SUMMARY OF THE EMBODIMENTS

In accordance with a first aspect of the present disclosure, there is provided an inductive power transmitter comprising: at least one first primary inductor configured to couple inductively with at least one secondary inductor and configured to hold a first variable electrical potential, at least one second primary inductor configured to couple inductively with at least one secondary inductor and configured to hold a second variable electrical potential, wherein the first primary inductor and the second primary inductor are arranged in an overlapping fashion on a substrate forming a charging surface, and wherein the first variable electrical potential differs from the second variable electrical potential according to a parameter selected from a phase, a driving frequency, or a combination thereof.

In certain embodiments of the disclosure, the first primary inductor and the second primary inductor comprise a series of parallel segments connected in series in a square wave-like pattern, and the first primary inductor and the second primary inductor are arranged such that the parallel segments of the first primary inductor and the second primary inductor alternate along one axis along the charging surface.

In certain embodiments of the disclosure, the first primary inductor is holding the first variable electrical potential and the second primary inductor is holding the first variable electrical potential simultaneously.

In certain embodiments of the disclosure, the inductive power transmitter capable of transmitting power from any location of said charging surface.

In certain embodiments of the disclosure, the first primary inductor is connected to a first driver capable of providing said first variable electrical potential, and the second primary inductor is connected to a second driver capable of providing said second variable electrical potential.

In certain embodiments of the disclosure, the first primary inductor is connected to a first driver capable of providing said first variable electrical potential, and the second primary inductor comprises at least one capacitor and is not connected to a driver.

In certain embodiments of the disclosure, the inductive power transmitter comprises a plurality of charging surfaces. Optionally, the first primary inductor of a first charging surface is electrically connected to the first primary inductor of the remaining charging surfaces. Optionally, the second primary inductor of a first charging surface is electrically connected to the second primary inductor of the remaining charging surfaces. Optionally, each of the plurality of second primary inductors comprises at least one capacitor.

In accordance with a first aspect of the present disclosure, there is provided an inductive power transmitter comprising at least one primary inductor configured to couple inductively with at least one secondary inductor and configured to hold a variable electrical potential, wherein the primary inductor comprises a series of parallel segments connected in series in a square wave-like pattern, and wherein the primary inductor is arranged on a substrate forming a charging surface.

In certain embodiments, the inductive power transmitter comprises a plurality of charging surfaces. Optionally, the primary inductor of a first charging surface is electrically connected to the primary inductor of the remaining charging surfaces.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inductive Power Transmitter With a Snake-Like Primary Inductor

Figure 1:
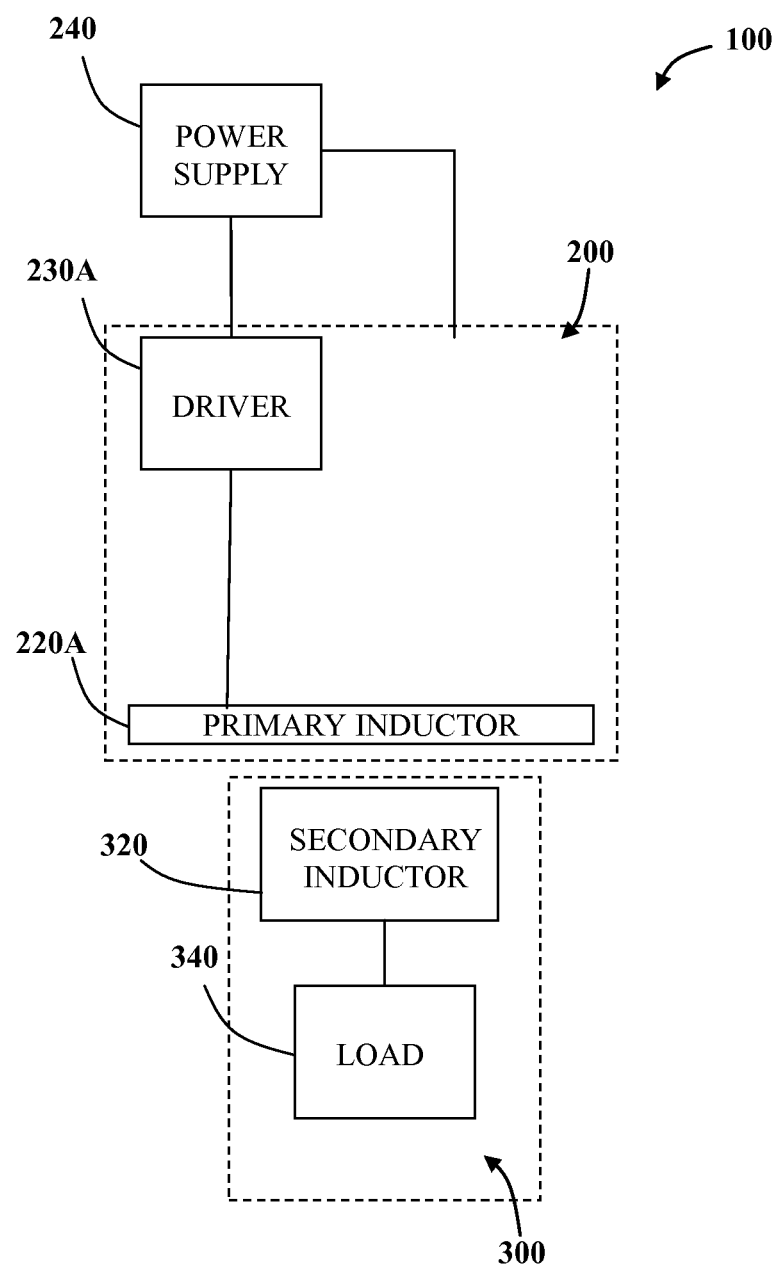
FIG. 1 is a block diagram showing an inductive power transfer system.

Reference is made to FIG. 1, which shows a block diagram showing various elements of an inductive power transfer system 100 operable to provide power inductively from an inductive power transmitter 200 to an inductive power receiver 300. The inductive power receiver 300 includes a secondary inductor 320 which may be wired to an electric load 340 via a reception circuit (not shown). When the secondary inductor 320 is placed inside the oscillating magnetic field produced by the primary inductors 220, an oscillating induced voltage is generated in the secondary inductor.

Figure 2:
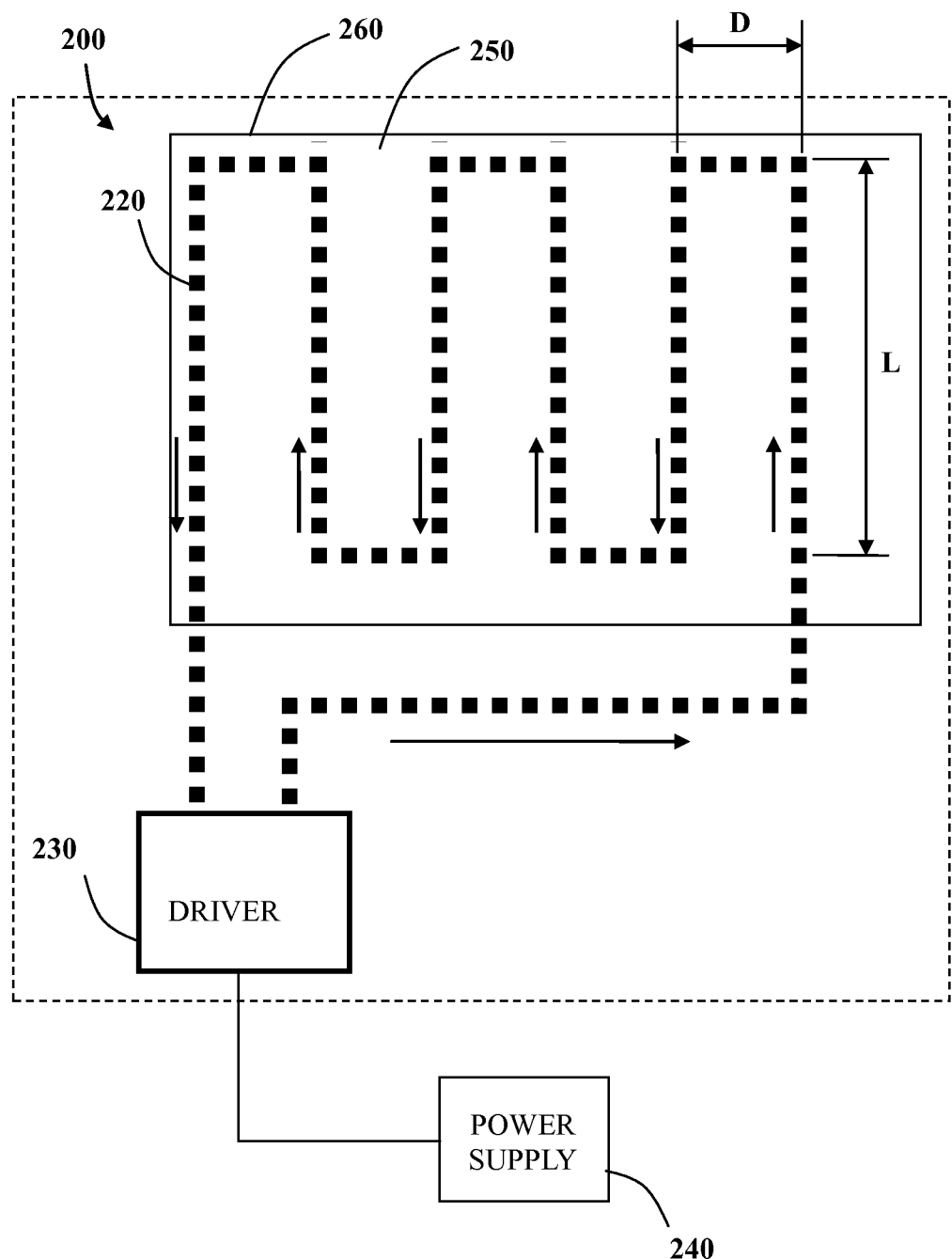
FIG. 2 is a schematic diagram showing the square wave-like primary inductor of the inductive power transmitter.

Referring to FIG. 2, the shape of the primary inductor 220 (situated on a substrate 250 to provide a charging surface 260) may be a snake-like shape, which may be defined as a shape or arrangement in which at least a portion of the primary inductor includes a series of parallel segments connected in series, such that the direction of a current passing through the segments alternate in direction, with the current direction of one segment having an antiparallel orientation in relation to the adjacent segments. The shape of the primary inductor 220 may be a square wave-like shape, as shown in FIG. 2, or other shapes, for example, a zig-zag shape or the like. The segments of the primary inductor 220 may be characterized by a length L, with each segment being separated from each other by a distance D.

The antiparallel arrangement of the segments of the primary inductor 220 carrying a variable electric potential (e.g., produced by a driver 230) creates a regular pattern of an oscillating magnetic field that is capable of generating an induced current in a secondary inductor proximal to it. The properties of the oscillating magnetic field remain constant along the Y-axis parallel to the segments, and vary along the X-axis perpendicular to the segments. The driver 230 may be connected to a power source 240 such as a mains electricity socket, a transformer, a power pack, solar panel or the like. The size of the primary inductor 220 may be extended over a large area by increasing one or a combination of the following parameters: (1) the segment length L; and (2) the number of segments. Notably, the above changes in the primary inductor 220 will not change the pattern of the oscillating magnetic field generated thereby.

In certain applications of inductive power transfer systems, it is undesirable to have the oscillating magnetic field extend far into the Z axis (perpendicular to the plane of the charging surface 250). In an inductive power transmitter employing a snake-like shaped primary inductor 220, the extension of the oscillating magnetic field in the Z axis is unaffected by extending the area of the primary inductor as described above (e.g., increasing the segment length L and/or increasing the number of segments). As such, by using the primary inductor 220, it is possible to make a charging surface 250 that covers a large area, in which inductive coupling between the primary and the secondary inductors only occurs when the secondary inductor is very proximal to the charging surface.

Inductive Power Transmitter With Multiple Snake-Like Primary Inductors

An inductive power transmitter with one snake-like primary inductor may include areas where the magnetic fields cancel each other out such that no net induced current is generated in the secondary inductor (even when in close proximity).

Figure 3:
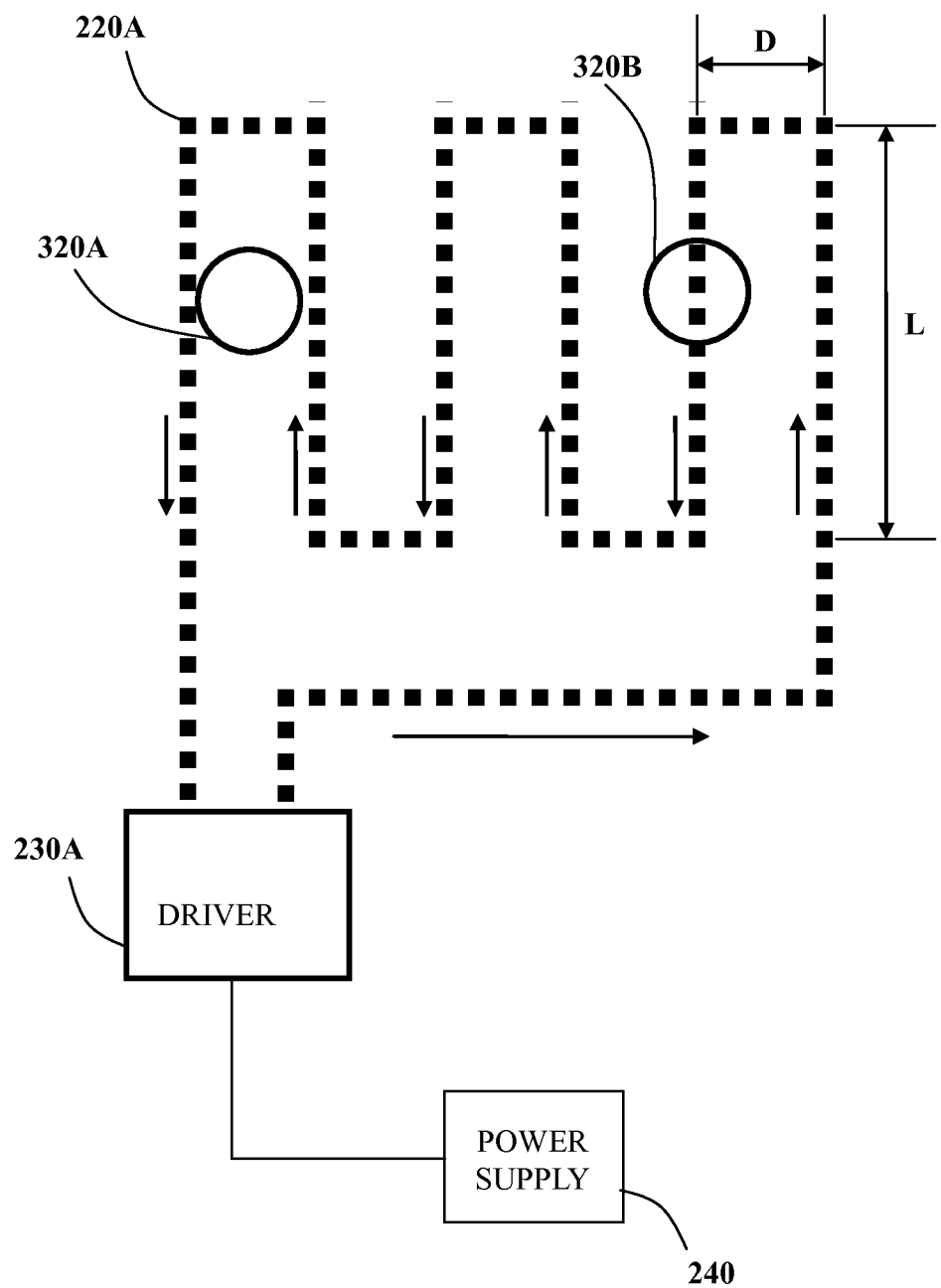
FIG. 3 is a schematic diagram showing the square wave-like primary inductor of the inductive power transmitter in relation to secondary coils from inductive power receivers.

For example, with reference to FIG. 3, while a secondary inductor 320A positioned between two segments of the primary inductor 220 may efficiently produce an induced current, a secondary inductor 320B positioned exactly on top of a segment may result in the combined effect of the surrounding oscillating magnetic fields producing little (or zero) net induced current.

As a further improvement in order to provide a more uniform magnetic field over a large surface, an inductive power transmitter may have multiple snake-like primary inductors placed in an overlapping arrangement. Such an arrangement may increase the uniformity of the level of power transfer across the lateral surface of the primary inductors, such that an inductive power receiver with a secondary inductor will efficiently receive power transmitted from the primary inductor with less variability depending on where on the lateral surface of the primary inductors the inductive power receiver is situated.

Figure 4:
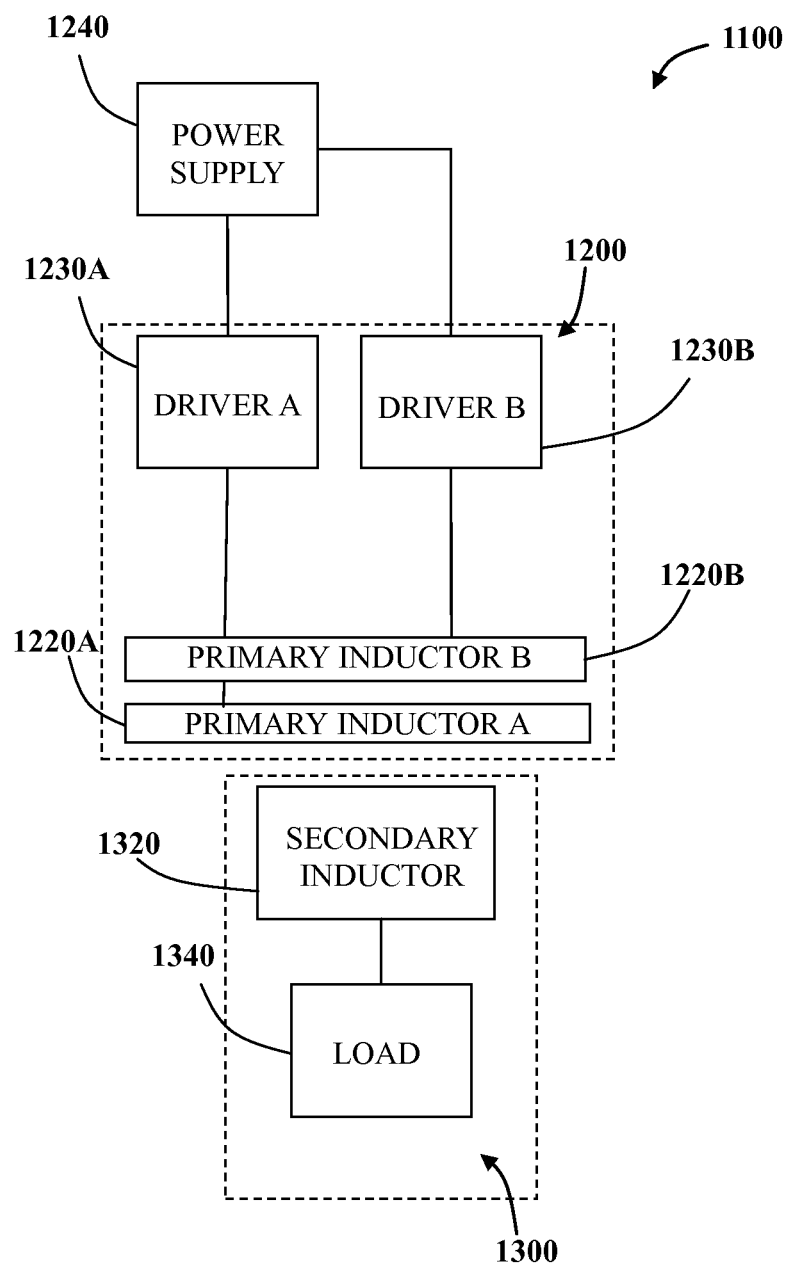
FIG. 4 is a block diagram showing an inductive power transfer system comprising two overlapping primary inductors.

Reference is now made to FIG. 4, which shows a block diagram showing various elements of an inductive power transfer system 1100 operable to provide power inductively from an inductive power transmitter 1200 to an inductive power receiver 1300. The inductive power receiver 1300 includes a secondary inductor 1320 which may be wired to an electric load 1340 via a reception circuit (not shown). When the secondary inductor 1320 is placed inside the oscillating magnetic field produced by the inductive power transmitter 1200, an oscillating induced voltage is induced in the secondary inductor 1320.

The inductive power transmitter 1200 includes at least two primary inductors 1220 (e.g., 1220A and 1220B, as shown in FIG. 4). Each primary inductor 1220A, 1220B may be connected to a corresponding driver 1230A, 1220B. Each driver 1230A, 1230B may be connected to a power source 1240 such as a mains electricity socket, a transformer, a power pack, solar panel or the like. Each driver 1230A, 1230B may be connected to the same power supply 1240. Alternatively, each driver 1230A, 1230B may be connected to a different power supply 1240 (not shown). The drivers 1230A, 1230B are operable to provide a variable electric potential across the primary inductors 1220A, 1220B at a selected driving frequency thereby producing an oscillating magnetic field in the vicinity of the primary inductors 1220A, 1220B. It is noted that such an oscillating magnetic field may be used to induce an electric potential in a secondary inductor 1320 of a nearby inductive receiver 1300.

Figure 5:
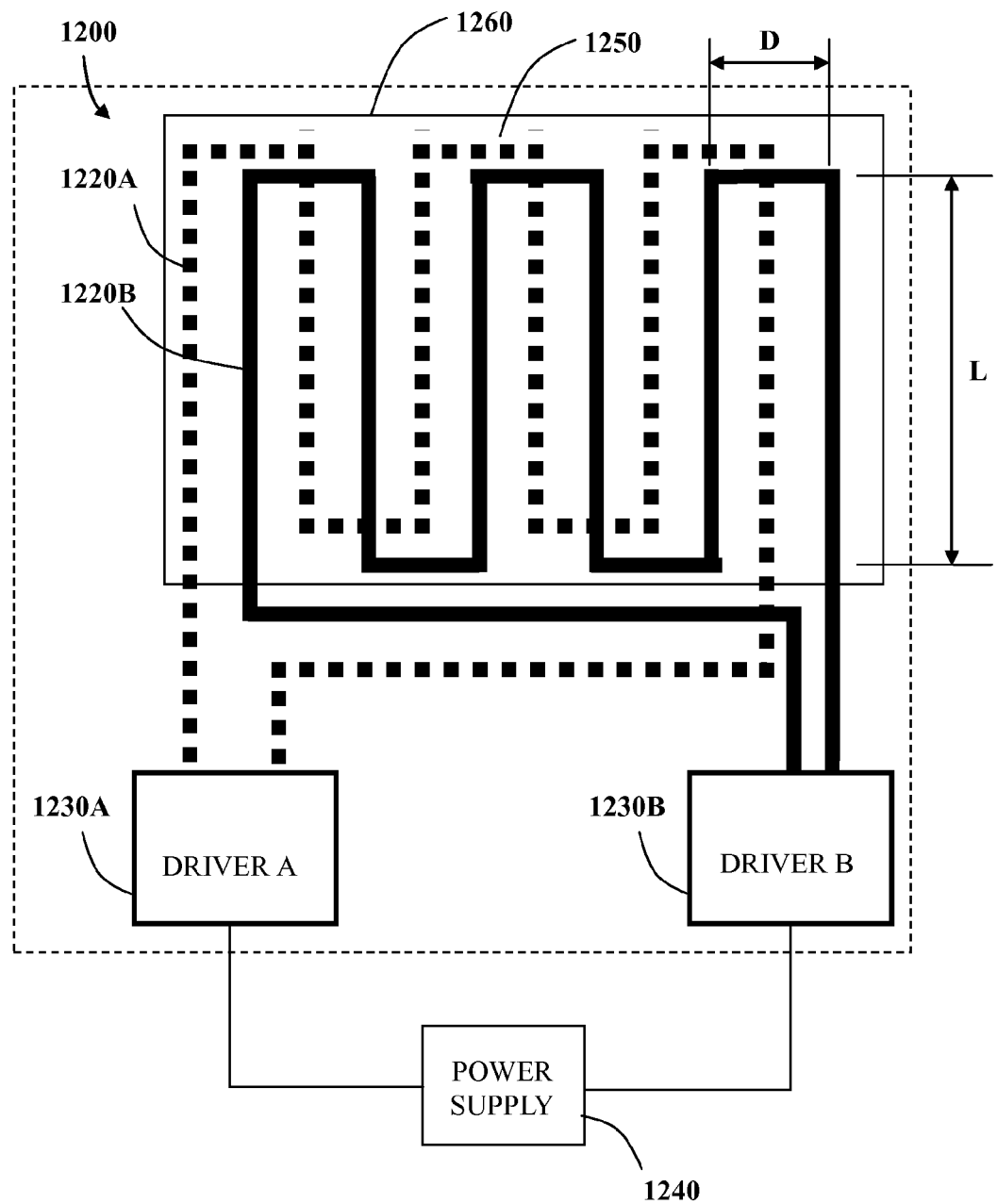
FIG. 5 is a schematic diagram showing the inductive power transfer system comprising two overlapping primary inductors, with further detail on the square wave-like shape of the primary inductors.

Referring to FIG. 5, the primary inductors 1220A, 1220B may have a snake-like shape. Each of the primary inductors 1220A, 1220B may be characterized by a series of parallel segments having a length L, connected in series in a square wave-like pattern. Each of the segments may be separated from each other by a distance D. The square wave-like pattern results in the direction of a current passing through the segments being in an antiparallel orientation to the adjacent segments.

A first primary inductor 1220A may be situated from a second primary inductor 1220B in an overlapping and staggered fashion. Each primary inductor 1220A, 1220B is electrically insulated from the other. The primary inductors may be arranged on a substrate 1250 to provide a charging surface 1260. In certain embodiments, the dimensions of the primary inductors 1220A and 1220B (e.g., the number of segments, the respective segment length L and the intersegment distance D) may be identical, and staggered such that the distance from a segment of primary inductor 1220A to the adjacent segment of overlapping primary inductor 1220B is half of the intersegment distance D. For example, parallel segments of the first primary inductor and the second primary inductor alternate along one axis along the charging surface. In addition, the horizontal portions of primary inductor 1220A and primary inductor 1220B may be completely overlapped with no stagger (not shown).

Each primary inductor 1220A, 1220B may be connected to a corresponding driver 1230A, 1230B. Each driver 1230A, 1230B may be connected to a power source 1240 such as a mains electricity socket, a transformer, a power pack, solar panel or the like. Each driver 1230A, 1230B may be connected to the same power supply 1240. Alternatively, each driver 1230A, 1230B may be connected to a different power supply 1240 (not shown).

Figure 6A:
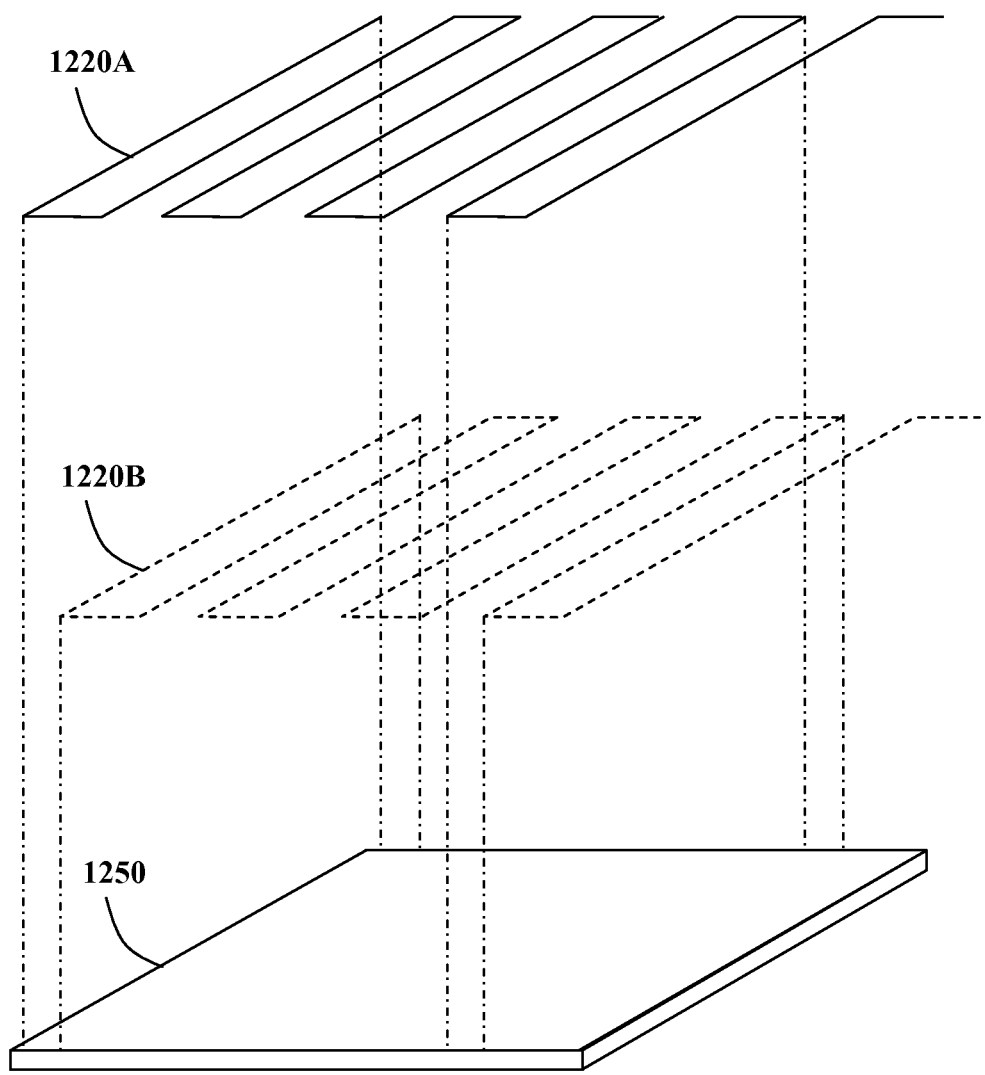
FIG. 6A is an exploded view of a charging surface showing the primary inductors and a substrate.
Figure 6B:
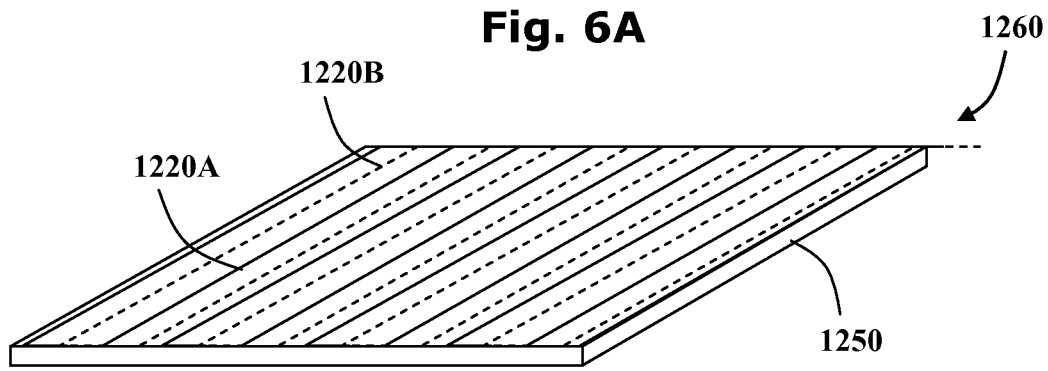
FIG. 6B is a diagonal view of the charging surface with the primary inductors and a substrate.

Reference is now made to FIGS. 6A and 6B, which shows two primary inductors, 1220A and 1220B situated on a substrate 1250 to form a charging surface 1260. The dimensions of the primary inductors 1220A and 1220B (the respective segment length L and intersegment distance D) may be identical, and staggered such that the distance from a segment of primary inductor 1220A to the adjacent segment of overlapping primary inductor 1220B is half of the intersegment distance D between adjacent vertical portions within one primary inductor. For example, parallel segments of the first primary inductor and the second primary inductor alternate along one axis along the charging surface. Further, the horizontal portions of primary inductor 1220A and primary inductor 1220B may be completely overlapped with no stagger.

The Variable Electric Potential Provided to the Primary Inductors

With reference to FIGS. 4 and 5, each driver 1230A, 1230B may provide a variable electrical potential to the corresponding primary inductor 1220A, 1220B connected to it, respectively.

In certain embodiments, each driver 1230A, 1230B may provide a variable electrical potential to the corresponding primary inductor 1220 A, 1220B in an alternating fashion, e.g., the inductive power transmitter 1200 alternates between two modes: (1) the first driver 1230A is active and providing a variable electrical potential through the first primary inductor 1220A while the second driver 1230B is inactive; and (2) the second driver 1230B is active and providing a variable electrical potential through the second primary inductor 1220B while the first driver 1230A is inactive.

Alternatively, each driver 1230A, 1230B may be providing a variable electrical potential to the corresponding primary inductor 1220A, 1220B simultaneously. In other words, each primary inductor may be holding a variable electrical potential simultaneously. The variable electric potential may be characterized by various parameters, e.g., a driving frequency f or a phase p. The first variable electrical potential provided to the first primary inductor 1220A may be different from the second variable electrical potential provided to the second primary inductor 1220B in at least one parameter, or a combination of parameters. The first variable electrical potential provided to the first primary inductor 1220A may have a first driving frequency fA that is different from second variable electrical potential provided to the second primary inductor 1220B having a second driving frequency fB. Alternatively or in combination, the phase pA of the first variable electrical potential provided to the first primary inductor 1220A and the phase pB of the second variable electrical potential provided to the second primary inductor 1220B may be out of phase in relation to each other.

When the first variable electrical potential provided to the first primary inductor 1220A and the second variable electrical potential provided to the second primary inductor 1220B have a different driving frequency, or are out of phase, or both, the resulting oscillating magnetic fields from the respective primary inductors will interact in such a way that that the net magnetic field within a given location of the charging surface 1260 fluctuates over time. Thus, every location on the charging surface 1260 is capable of transmitting power to a secondary inductor placed in proximity to it over time.

Multiple Primary Inductors, Single Driver Systems

Figure 7:
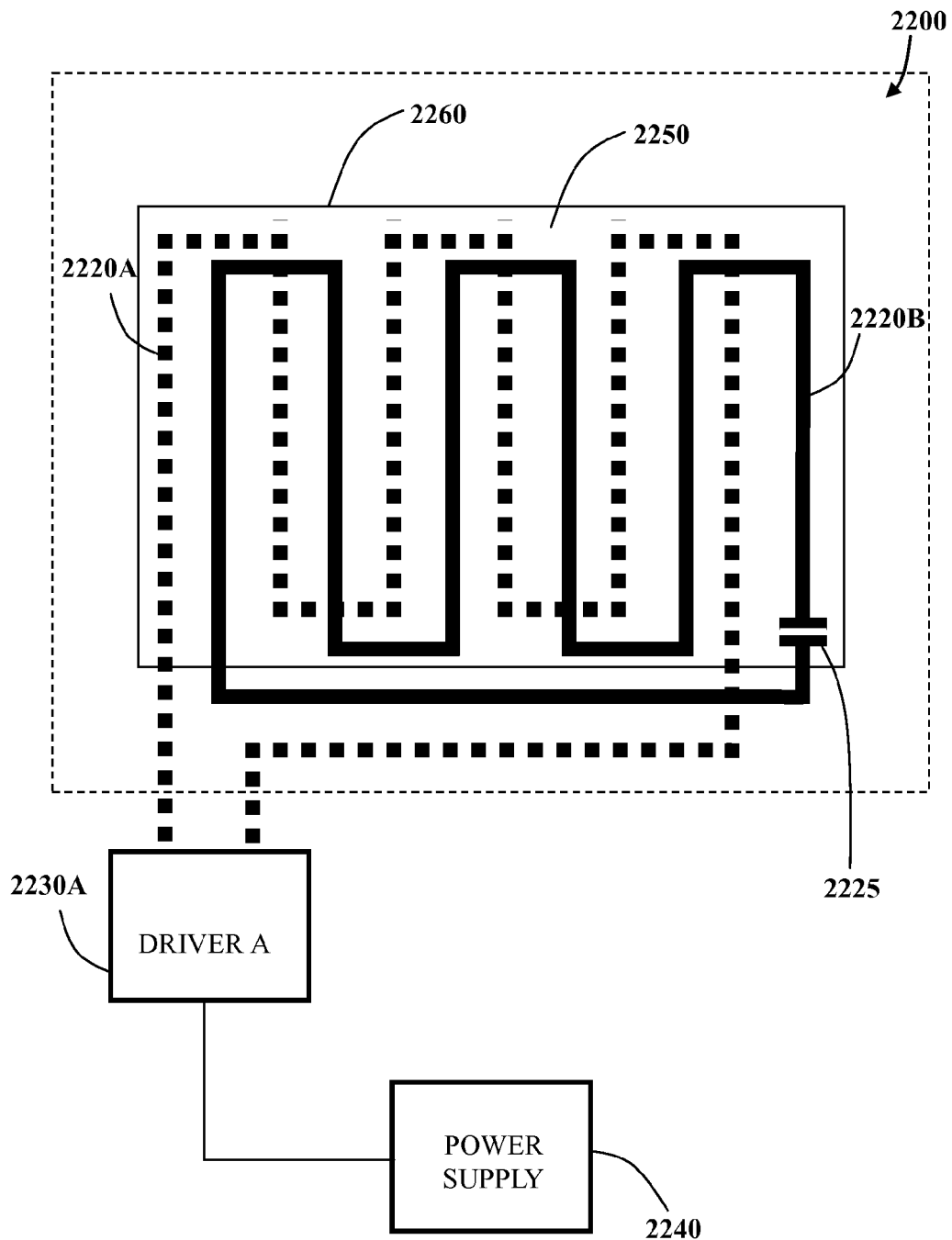
FIG. 7 is a schematic diagram of an alternative inductive power transmitter with one primary inductor comprising a transistor and not connected to a driver.

Reference is now made to FIG. 7, which shows a schematic of an inductive power transmitter 2200 with multiple primary inductors 2220A, 2220B, with only one of said primary inductors being connected to a driver 2230. The inductive power transmitter 2200 includes at least two primary inductors, a first primary inductor 2220A and a second primary inductor 2220B. The first primary inductor 2220A may be situated from the second primary inductor 2220B in an overlapping and staggered fashion. Each primary inductor 2220 is electrically insulated from the other. The primary inductors 2220 may be arranged on a substrate 2250 to provide a charging surface 2260.

Each of the primary inductors 2220A and 2220B may carry a variable electrical potential of the same frequency but in a shifted phase. This may be achieved by only having a first primary inductor 2220A connected to a driver 2230A providing a variable electrical potential, while the second primary inductor 2220B, with a capacitor 2225, is unconnected to a driver. For example, the first primary inductor 2220A may be connected to a driver 2230A, which may be connected to a power source 2240 such as a mains electricity socket, a transformer, a power pack, solar panel or the like. The driver 2230A is operable to provide a variable electric potential across the primary inductors 2220A at a selected driving frequency thereby producing an oscillating magnetic field in the vicinity of the primary inductors 2220A. The second primary inductor 2220B may not be connected to a driver. Rather, the second primary inductor 2220B may comprise a capacitor 2225 and may act as a repeater, where the magnetic field generated from the first primary inductor 2220A creates an induced current in the second primary inductor 2220B, which generates therefrom its own oscillating magnetic field in the same frequency as, but out of phase with, that of the first primary inductor 2220A.

When the first variable electrical potential provided to the first primary inductor 2220A and the second variable electrical potential generated in the second primary inductor 2220B are out of phase, the resulting oscillating magnetic fields from the respective primary inductors will interact in such a way that that the net magnetic field within a given location of the charging surface 2260 fluctuates over time. Thus, every location on the charging surface 2260 is capable of transmitting power to a secondary inductor placed in proximity to it over time.

Connecting Multiple Charging Surfaces

Figure 8:
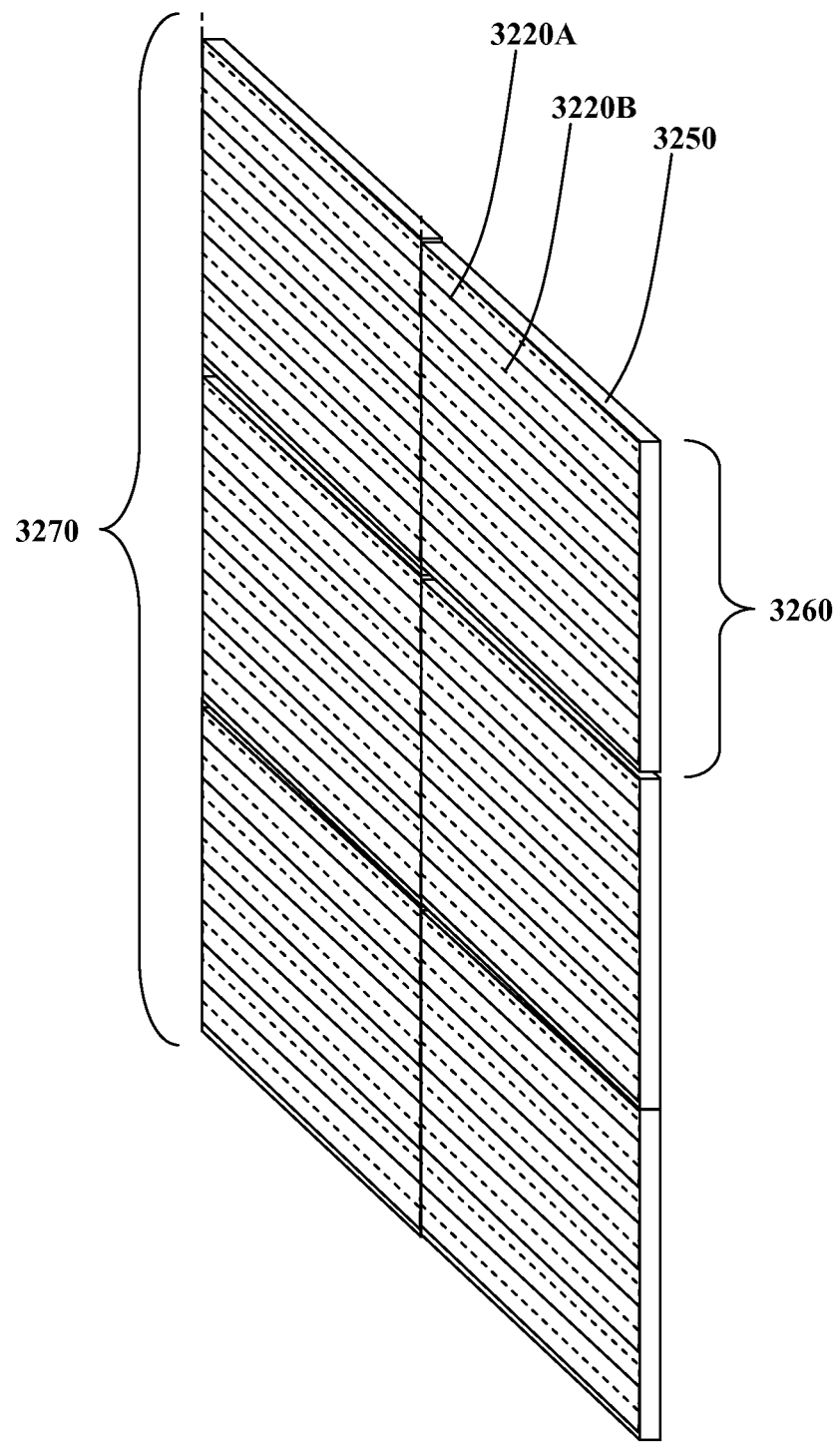
FIG. 8 is a diagonal view of multiple charging surfaces connected to form an extended charging surface.

With reference to FIG. 8, a plurality of charging surfaces 3260, each comprising a first primary inductor 3220A, a second primary inductor 3220B and a substrate 3250 may be connected to each other as an array to form an extended charging surface 3270. Each charging surface 3260 may be rectangular in shape, and characterized by a length and a width. The length may be about 10 cm, about 20 cm, about 30 cm, about 40 cm, about 50 cm, about 60 cm, about 70 cm, about 80 cm, about 90 cm, about 100 cm, about 1.5 meters, about two meters, between 50 cm and 1 meter, between 1 meter and 2 meters, over 50 cm, over 1 meter, and over 2 meters. The width may be about 10 cm, about 20 cm, about 30 cm, about 40 cm, about 50 cm, about 60 cm, about 70 cm, about 80 cm, about 90 cm, about 100 cm, about 1.5 meters, about two meters, between 50 cm and 1 meter, between 1 meter and 2 meters, over 50 cm, over 1 meter, and over 2 meters. The connection of multiple charging surfaces 3260 enables the formation of an extended charging surface 3270 whose dimensions are a multiple of the charging surfaces 3260 comprised therein. Charging surfaces 3260 of non-rectangular shapes, as well as an extended charging surface 3270 comprising charging surfaces of different dimensions and shapes, are also envisioned.

Figure 9:
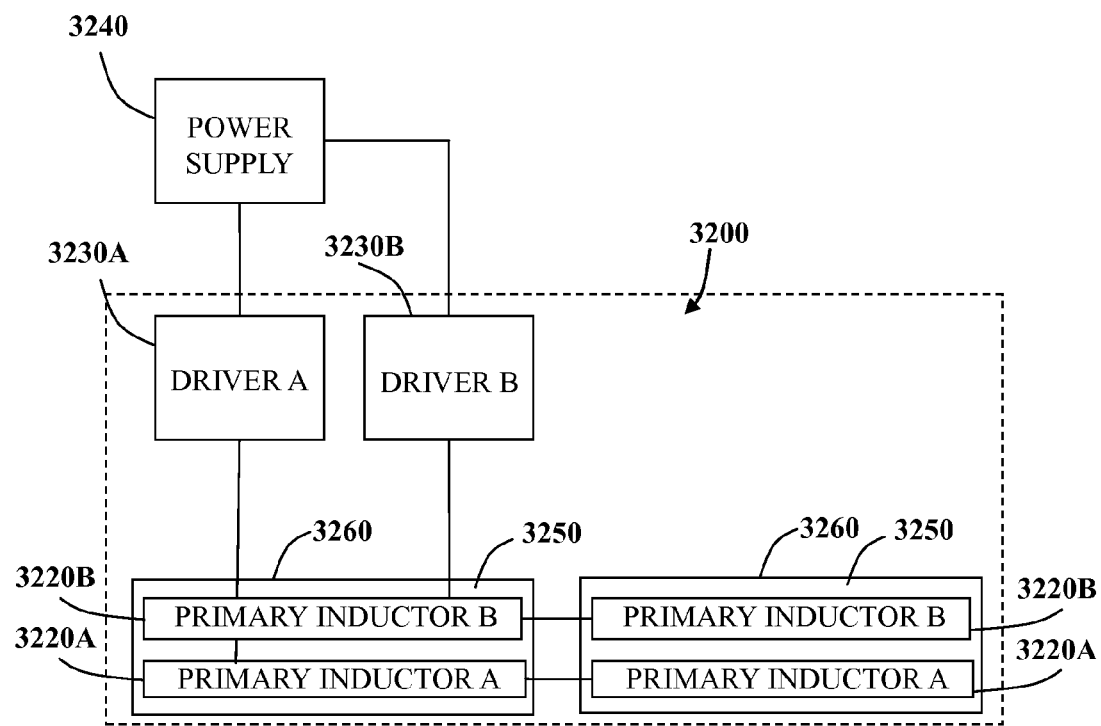
FIG. 9 is a block diagram showing an inductive power transmitter with an extended charging surface comprising multiple charging surfaces.

Reference is made to FIG. 9, showing a block diagram of an inductive power transmitter 3200. Each of the first primary inductors 3220A from each charging surface 3260 may be electrically connected to each other, and each of the second primary inductors 3220B from each charging surface 3260 may be electrically connected to each other. All of the first primary inductors 3220A may be activated by the first driver 3230A, and all of the second primary inductors 3220B may be activated by the second driver 3230B.

Each driver 3230A, 3230B may be connected to a power source 3240 such as a mains electricity socket, a transformer, a power pack, solar panel or the like. Each driver 3230A, 3230B may be connected to the same power supply 3240. Alternatively, each driver 3230A, 3230B may be connected to a different power supply 3240 (not shown). The drivers 3230A, 3230B are operable to provide a variable electric potential across the corresponding primary inductors 3220A, 3220B at a selected driving frequency thereby producing an oscillating magnetic field in the vicinity of the primary inductors 3220A, 3220B.

Figure 10:
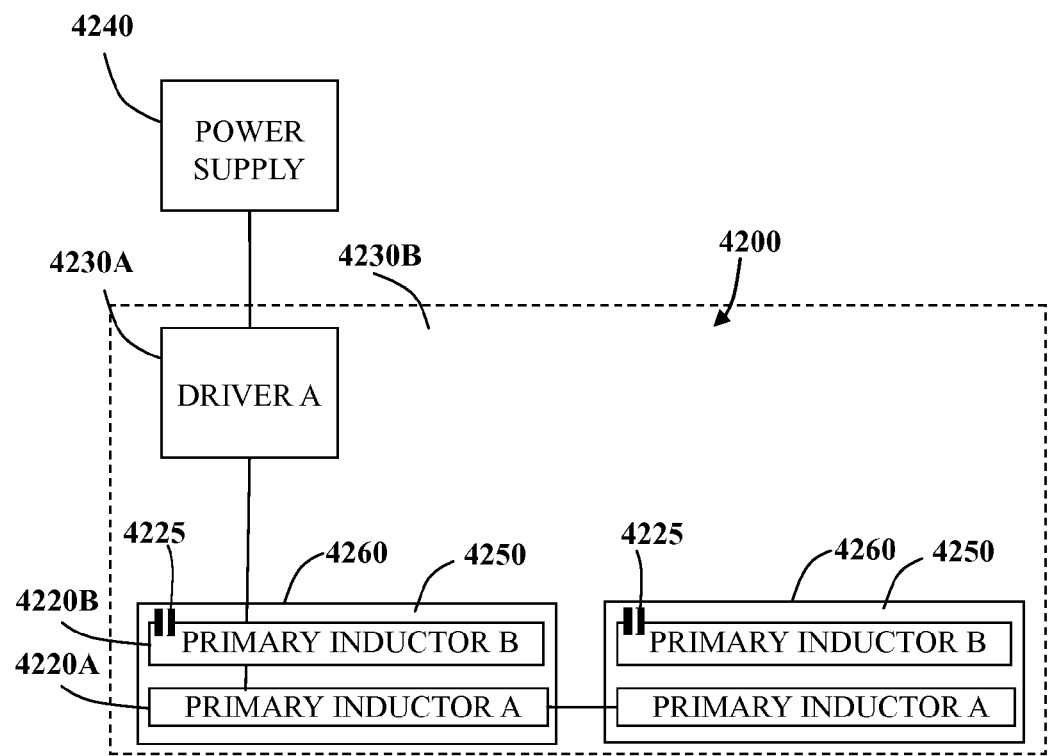
FIG. 10 is a block diagram showing an alternative arrangement of an inductive power transmitter with an extended charging surface comprising multiple charging surfaces.

Reference is made to FIG. 10, showing a block diagram of an inductive power transmitter 4200. Each of the first primary inductors 4220A from each charging surface 4260 may be electrically connected to each other. All of the first primary inductors 4220A may be activated by a driver 4230A. The second primary inductors 4220B may comprise a capacitor 4225 and may not be connected to a driver. Further, the second primary inductors 4220B from each charging surface 4260 may not be electrically connected to each other. Alternatively, each of the second primary inductors 4220B from each charging surface 4260 may be electrically connected to each other (not shown).

The driver 4230A may be connected to a power source 4240 such as a mains electricity socket, a transformer, a power pack, solar panel or the like. The driver 4230A is operable to provide a variable electric potential across the first primary inductors 4220A at a selected driving frequency thereby producing an oscillating magnetic field in the vicinity of the primary inductors 4220A as well as 4220B, as described in relation to multiple primary inductors, single driver systems in reference to FIG. 7, such that the primary inductors 4220A and 4220B may carry a variable electrical potential of the same frequency but in a shifted phase due to the presence of the capacitors 4225 in the primary inductors 4220B.

The scope of the disclosed subject matter is defined by the appended claims and includes both combinations and sub combinations of the various features described hereinabove as well as variations and modifications thereof, which would occur to persons skilled in the art upon reading the foregoing description.

While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An inductive power transmitter comprising:
   at least one first primary inductor configured to couple inductively with at least one first secondary inductor and configured to hold a first variable electrical potential, and
   at least one second primary inductor configured to couple inductively with at least one second secondary inductor and configured to hold a second variable electrical potential,
   wherein the first primary inductor and the second primary inductor are arranged in an overlapping fashion on a substrate forming a charging surface, and
   wherein the first variable electrical potential differs from the second variable electrical potential according to a parameter selected from the group consisting of a phase, a driving frequency, and a combination thereof wherein the first primary inductor is connected to a first driver capable of providing said first variable electrical potential, and the second primary inductor is connected to a second driver capable of providing said second variable electrical potential.

2. The inductive power transmitter of claim 1, wherein the first primary inductor and the second primary inductor comprise a series of parallel segments connected in series in a square wave-like pattern, and
   wherein the first primary inductor and the second primary inductor are arranged such that the parallel segments of the first primary inductor and the second primary inductor alternate along one axis along the charging surface.

3. The inductive power transmitter of claim 1, wherein, simultaneously, the first primary inductor is holding the first variable electrical potential and the second primary inductor is holding the first variable electrical potential.

4. The inductive power transmitter of claim 1 capable of transmitting power from any location of said charging surface.

5. The inductive power transmitter of claim 1 comprising a plurality of charging surfaces.

6. The inductive power transmitter of claim 5, wherein the first primary inductor of a first charging surface is electrically connected to the first primary inductor of the remaining charging surfaces.

7. The inductive power transmitter of claim 6, wherein the second primary inductor of a first charging surface is electrically connected to the second primary inductor of the remaining charging surfaces.

8. The inductive power transmitter of claim 5, wherein each of the plurality of second primary inductors comprises at least one capacitor.

9. An inductive power transmitter comprising:
at least one first primary inductor configured to couple inductively with at least one first secondary inductor and configured to hold a first variable electrical potential, and
at least one second primary inductor configured to couple inductively with at least one second secondary inductor and configured to hold a second variable electrical potential,
wherein the first primary inductor and the second primary inductor are arranged in an overlapping fashion on a substrate forming a charging surface, and
wherein the first variable electrical potential differs from the second variable electrical potential according to a parameter selected from the group consisting of a phase, a driving frequency, and a combination thereof, wherein the first primary inductor is connected to a first driver capable of providing said first variable electrical potential, and the second primary inductor comprises at least one capacitor and is not connected to a driver.

10. The inductive power transmitter of claim 9, wherein the first primary inductor and the second primary inductor comprise a series of parallel segments connected in series in a square wave-like pattern, and
wherein the first primary inductor and the second primary inductor are arranged such that the parallel segments of the first primary inductor and the second primary inductor alternate along one axis along the charging surface.

11. The inductive power transmitter of claim 9, wherein, simultaneously, the first primary inductor is holding the first variable electrical potential and the second primary inductor is holding the first variable electrical potential.

12. The inductive power transmitter of claim 9 capable of transmitting power from any location of said charging surface.

13. The inductive power transmitter of claim 9 comprising a plurality of charging surfaces.

14. The inductive power transmitter of claim 12, wherein the first primary inductor of a first charging surface is electrically connected to the first primary inductor of the remaining charging surfaces.

15. The inductive power transmitter of claim 13, wherein the second primary inductor of a first charging surface is electrically connected to the second primary inductor of the remaining charging surfaces.

16. The inductive power transmitter of claim 12, wherein each of the plurality of second primary inductors comprises at least one capacitor.

* * * * *